(12) United States Patent
Liu

(10) Patent No.: US 10,322,565 B2
(45) Date of Patent: Jun. 18, 2019

(54) RESIN COMPOSITION AND USES OF THE SAME

(71) Applicant: Taiwan Union Technology Company, Chupei (TW)

(72) Inventor: Shur-Fen Liu, Chupei (TW)

(73) Assignee: TAIWAN UNION TECHNOLOGY CORPORATION, Chupei, Hsinchu (TW)

( * ) Notice: Subject to any disclaimer, the term of this patent is extended or adjusted under 35 U.S.C. 154(b) by 18 days.

(21) Appl. No.: 15/865,476

(22) Filed: Jan. 9, 2018

(65) Prior Publication Data

US 2018/0126699 A1 May 10, 2018

Related U.S. Application Data

(62) Division of application No. 13/479,449, filed on May 24, 2012, now Pat. No. 9,902,136.

(30) Foreign Application Priority Data

Mar. 23, 2012 (TW) .............................. 101110120 A

(51) Int. Cl.
| | | |
|---|---|---|
| *B32B 15/08* | (2006.01) | |
| *C08G 65/48* | (2006.01) | |
| *C08L 79/08* | (2006.01) | |
| *B32B 27/30* | (2006.01) | |
| *C08L 61/06* | (2006.01) | |
| *C08L 61/14* | (2006.01) | |
| *C08L 71/12* | (2006.01) | |

(52) U.S. Cl.
CPC .............. *B32B 15/08* (2013.01); *B32B 27/30* (2013.01); *C08G 65/485* (2013.01); *C08L 61/06* (2013.01); *C08L 61/14* (2013.01); *C08L 71/12* (2013.01); *C08L 79/085* (2013.01); *Y10T 428/31678* (2015.04)

(58) Field of Classification Search
CPC ......... B32B 15/08; B32B 27/30; C08L 71/12; C08L 61/06; C08L 61/14; C08L 79/085; Y10T 428/31678; C08G 65/485
See application file for complete search history.

(56) References Cited

U.S. PATENT DOCUMENTS

| | | | |
|---|---|---|---|
| 4,239,673 A | 12/1980 | Lee, Jr. | |
| 5,071,929 A | 12/1991 | Hanyuda et al. | |
| 5,218,030 A | 6/1993 | Katayose et al. | |
| 6,352,782 B2 | 3/2002 | Yeager et al. | |
| 6,780,943 B2 | 8/2004 | Liu et al. | |
| 8,034,442 B2 | 10/2011 | Kaneko et al. | |
| 2004/0132925 A1 | 7/2004 | Saitou et al. | |
| 2006/0041086 A1 | 2/2006 | Birsak et al. | |
| 2007/0082987 A1 | 4/2007 | Peters et al. | |
| 2008/0051522 A1 | 2/2008 | Birsak et al. | |
| 2008/0171817 A1 | 7/2008 | Peters et al. | |
| 2009/0203279 A1 | 8/2009 | Mori et al. | |
| 2014/0057086 A1 | 2/2014 | Tietze et al. | |

FOREIGN PATENT DOCUMENTS

| | | |
|---|---|---|
| CN | 1458963 A | 11/2003 |
| CN | 101508844 A | 8/2009 |
| CN | 102115569 A | 7/2011 |
| EP | 1274800 B1 | 2/2006 |
| JP | 2011001473 A | 1/2011 |
| TW | 574313 B | 2/2004 |
| TW | 201124478 A1 | 7/2011 |

OTHER PUBLICATIONS

Chinese Office Action in the parent application dated Nov. 4, 2014.
Rodriguez, Principles of Polymer Systems, 3rd Ed., 1989, p. 511, Hemisphere Publishing Corporation.

*Primary Examiner* — Kevin R Kruer
(74) *Attorney, Agent, or Firm* — Ferrells, PLLC; Michael W. Ferrell; Anna L. Kinney

(57) ABSTRACT

A resin composition is provided. The resin composition comprises:
(a) a resin of formula (I);

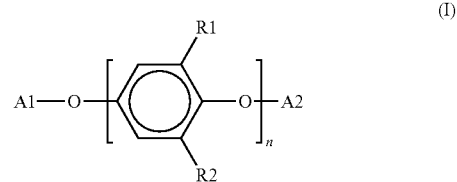

(b) a cross-linking agent; and
(c) a compound of formula (II);

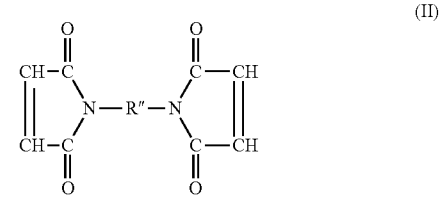

wherein, R1, R2, A1, A2, n, and R" are as defined in the specification; and the weight ratio of the resin (a) and the cross-linking agent (b) are about 6:1 to about 1:1, and the weight ratio of the compound (c) and the total weight of the resin (a) and the cross-linking agent (b) are about 1:1 to about 1:20.

14 Claims, No Drawings

RESIN COMPOSITION AND USES OF THE SAME

CLAIM FOR PRIORITY

This application is a division of U.S. patent application Ser. No. 13/479,449, filed May 24, 2012, now U.S. Pat. No. 9,902,136. U.S. patent application Ser. No. 13/479,449 claims priority to Taiwan Patent Application No. 101110120 filed on Mar. 23, 2012. The priorities of U.S. patent application Ser. No. 13/479,449 and Taiwan Patent Application No. 101110120 are hereby claimed and their disclosures are incorporated by reference in their entireties.

BACKGROUND OF THE INVENTION

Field of the Invention

The present invention relates to a resin composition. Specifically, the present invention relates to a resin composition comprising a resin with a vinyl-containing or allyl-containing group, bismaleimide, and a cross-linking agent, and a prepreg and laminate prepared using the same.

Descriptions of the Related Art

Printed circuit boards (PCBs) are circuit substrates that are used for electronic devices to load other electronic components and to electrically connect the components to provide a stable circuit working environment. One kind of conventional printed circuit board is a copper clad laminate (CCL), which is primarily composed of resin(s), reinforcing material(s) and copper foil(s). Conventional resins include epoxy resins, novolac resins, polyamine formaldehyde resins, silicone resins or polytetrafluoroethylene resins; and conventional reinforcing materials include glass fiber cloths, glass fiber mats, insulating papers or linen cloths.

In general, a printed circuit board can be prepared using the following method: immersing a reinforcing material, such as glass fiber fabric into a resin (such as epoxy resin), and curing the immersed glass fiber fabric into a half-hardened state, i.e. B-stage, to obtain a prepreg; superimposing certain layers of the prepregs and superimposing a metal foil on at least one external surface of the superimposed prepregs to provide a superimposed object; hot-pressing the superimposed object, i.e. C-stage, to obtain a metal clad laminate; etching the metal foil on the surface of the metal clad laminate to form a defined circuit pattern; and finally, drilling a plurality of holes on the metal clad laminate and plating these holes with a conductive material to accomplish the preparation of the printed circuit board.

Printed circuit boards prepared by using an epoxy resin may be provided with proper physicochemical properties such as heat resistance, chemical stability, mechanical strength, etc. However, printed circuit boards thus prepared are also provided with a high dielectric constant (Dk) value, a high dissipation factor (DO value, and high $H_2O$ absorption rate, which all lead to the deterioration of the signal transmission quality (e.g., a slow signal transmission rate and signal loss). As a result, the laminates prepared by using an epoxy resin are gradually failing to meet the requirements for high frequency and high-speed signal transmission for smaller, lighter, and thinner electronic products. Hence, TW Patent No. 574313 provides a resin composition for producing laminates, which lowers the Dk and Df values of the printed circuit boards by adding polyphenylene ether resin and bismaleimide into epoxy resin. However, in practical application, due to the difference in the polarity of chemical structure, polyphenylene ether resin and epoxy resin are poorly compatible with each other, making it difficult to process and limiting the usage of the resin composition. It is also hard to sufficiently utilize the properties of polyphenylene ether resin in the composition.

U.S. Pat. No. 5,218,030 disclosed a resin composition using polyphenylene ether resin and triallyl isocyanurate (TAIC). Although the resin composition can avoid the disadvantages of using epoxy resins, the material, thus prepared, lacks a sufficient heat resistance property. U.S. Pat. No. 8,034,442 B2 disclosed a resin composition, which comprises diphenylmethane bismaleimide, alkenyl phenol ether compounds, alkenyl aromatic comonomer, and TAIC. The resin composition is capable of providing a complex material with excellent heat resistance. However, since the ingredients of the resin composition are expensive, the resin composition is mainly used to produce a high level laminate requiring extremely high heat resistance but not suitable to mass-produce middle or low level laminates (such as FR-4 laminates).

In this regard, the present invention provides a resin composition for preparing a laminate, wherein the gel time of the resin composition is short, which can considerably shorten the processing time. The laminate prepared thereby is provided with outstanding physicochemical properties, adhesion to a metal foil, and electrical properties.

SUMMARY OF THE INVENTION

An object of the invention is to provide a resin composition comprising:

(a) a resin of formula (I);

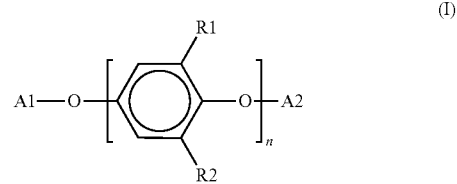

(b) a cross-linking agent; and
(c) a compound of formula (II);

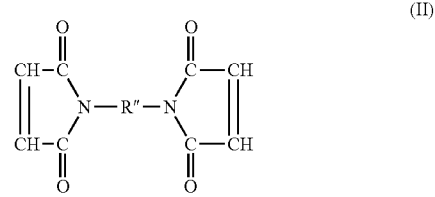

wherein,
R1 and R2 are independently H or a substituted or unsubstituted C1-C10 alkyl;
A1 and A2 are independently a vinyl-containing or allyl-containing group;
n is an integer ranging from 10 to 60;
R" is a substituted or unsubstituted methylene, 4,4'-diphenylmethane, m-phenylene, bisphenol A diphenyl ether, 3,3'-dimethyl-5,5'-diethyl-4,4'-diphenyl methane, 4-methyl-1,3-phenylene, or (2,2,4-trimethyl)hexane; and the weight ratio of the resin (a) and the cross-linking agent (b) is about 6:1 to about 1:1, and
the weight ratio of the compound (c) and the total weight of the resin (a) and the cross-linking agent (b) is about 1:1 to about 1:20.

Another object of the invention is to provide a prepreg, which is prepared by immersing a substrate into the resin composition described above, and drying the immersed substrate.

Yet a further object of the invention is to provide a laminate, comprising a synthetic layer and a metal layer, wherein the synthetic layer is made from the prepreg described above.

To render the above objects, technical features and advantages of the present invention more apparent, the present invention will be described in detail with reference to some embodiments hereinafter.

BRIEF DESCRIPTION OF THE DRAWINGS

Not applicable.

DETAILED DESCRIPTION OF THE INVENTION

Hereinafter, some embodiments of the present invention will be described in detail. However, the present invention may also be practiced in various different forms without departing from the spirits of the present invention. The scope of the present invention shall not be considered to be limited to what is illustrated herein. In addition, unless it is additionally explained, the expressions "a," "the," or the like recited in the specification (especially in the claims) should include the singular and the plural forms. The term "substituted" recited in the specification means that H is substituted by a substituent which can be any groups or atoms other than H. Furthermore, unless it is additionally explained, while describing the constituents in the solution, mixture and composition in the specification, the amount of each constituent is counted based on the solid content, i.e., disregarding the weight of the solvent.

One feature of the resin composition of the present invention is the use of a composition of a vinyl-containing or allyl-containing resin, a cross-linking agent, and bismaleimide. Under the synergistic effect of above resin (a), cross-linking agent (b), and compound (c), the gel time of the resin composition is shortened and the manufacturing cost is thus, lowered. The laminate manufactured by using the resin composition of the present invention is provided with outstanding physicochemical properties (e.g., a high Tg, low $H_2O$ absorption, good soldering resistance, good flame retardance, etc.), adhesion to a metal foil, and electrical properties (low Df, Dk).

Specifically, the resin composition of the invention comprises (a) a resin of formula (I), (b) a cross-linking agent, and (c) a compound of formula (II).

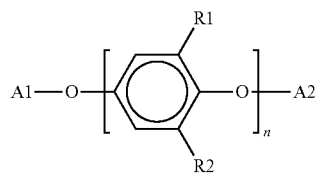
(I)

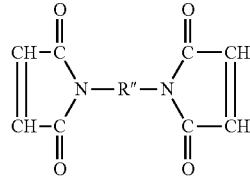
(II)

In the resin composition of the present invention, by using the combination of (a) the resin of formula (I) and (c) the compound of formula (II), the disadvantages of using polyphenylene ether resin alone (e.g., the prepared material is provided with poor heat resistance) can be eliminated and a material with the desired properties (e.g., a high Tg, low Dk, low Df, a good adhesion to a metal foil, etc.) can be provided. In formula (I), R1 and R2 are independently H or a substituted or unsubstituted C1-C10 alkyl, A1 and A2 are independently a vinyl-containing or allyl-containing group, and n is an integer ranging from 10 to 60. Preferably, R1 and R2 are independently H or a substituted or unsubstituted methyl; and A1 and A2 are independently selected from a group consisting of

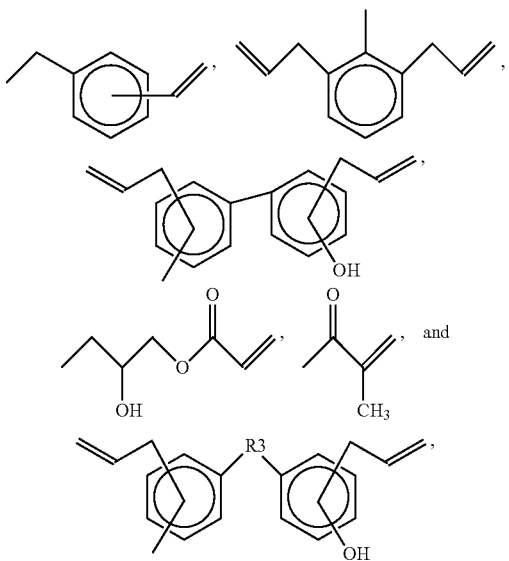

and R3 is —O— or —$SO_2$—. In some embodiments of the present invention, both R1 and R2 are $CH_3$, and both A1 and A2 are

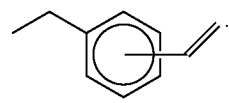

In addition, in formula (II), R″ is a substituted or unsubstituted methylene, 4,4′-diphenylmethane, m-phenylene, bisphenol A diphenyl ether, 3,3′-dimethyl-5,5′-diethyl-4,4′-diphenyl methane, 4-methyl-1,3-phenylene, or (2,2,4-trimethyl)hexane. For example, R″ can be selected from a group consisting of —$CH_2$—,

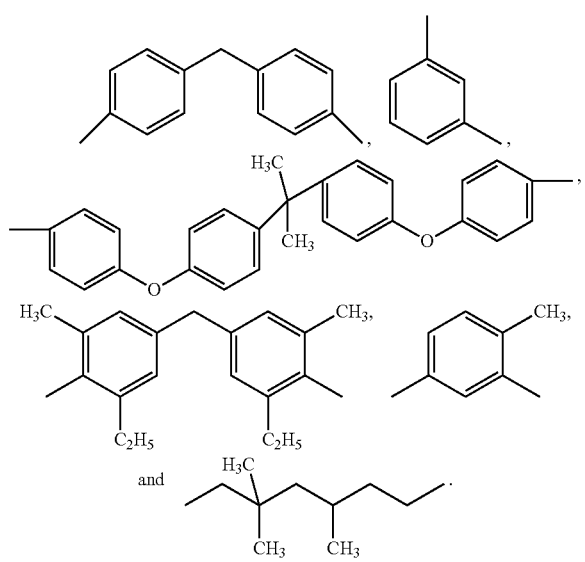

In some embodiments of the present invention, R″ is —CH$_2$—.

The resin composition of the present invention comprises a cross-linking agent (b), which can promote or adjust the bridging among the molecules; thereby, obtaining a network structure. The types of cross-linking agent (b) is not particularly limited, it can be any cross-linking agent which can provide the desired cross-linking effect. For example, but not limited, the cross-linking agent used in the resin composition of the present invention can be a known cross-linking agent selected from a group consisting of triallyl isocyanurate (TAIC), phenolic resin, allyl-containing phenolic resin, allyl-containing styrene maleic anhydride (SMA) resin, and mixtures thereof. In some embodiments of the present invention, TAIC is used as the cross-linking agent (b).

In the resin composition of the present invention, the weight ratio of the resin (a) and the cross-linking agent (b) is about 6:1 to about 1:1, preferably, about 4:1 to about 1:1, and the weight ratio of the compound (c) and the total weight of the resin (a) and the cross-linking agent (b) is about 1:1 to about 1:20, preferably, about 1:4 to 1:14. If the weight ratio of the resin (a) and the cross-linking agent (b) is too high (i.e. the amount of the cross-linking agent is too small), it may not be able to provide the desired cross-linking effect, and result in poor physicochemical properties of the prepared material; in addition, if the weight ratio of the compound (c) is too high, the original excellent properties of polyphenylene ether resin may not remain or may not be retained. In some embodiments of the present invention, the weight ratio of the resin (a) and the cross-linking agent (b) is about 4:1 to about 2:1; and the weight ratio of the compound (c) and the total weight ratio of the resin (a) and the cross-linking agent (b) is about 1:2 to about 1:10.

The resin composition of the present invention may optionally comprise other additives, such as a filler, a retardant, a hardening promoter, a dispersing agent, a flexibilizer, etc., and those additives may be taken alone or in combination. For example, a filler selected from a group consisting of silica, glass powder, talc, kaolin, pryan, mica, inorganic metal oxides (such as aluminium oxide, zirconium oxide), and a mixture thereof, but not limited thereto, may be added to improve the properties of the manufactured material (e.g., the processability, heat tolerance, moisture resistance, etc.). A phosphorous flame retardant or bromine-containing flame retardant (such as decabromobibenzyl, DBDPE), but not limited thereto, may be added to enhance the flame retardance of the manufactured material. A hardening promoter can also be added to improve hardness. As for the amount of those additives, it can be adjusted depending on the user's needs based on the disclosure of the specification, and is not particularly limited.

The resin composition of the present invention may be prepared into varnish form by evenly mixing the resin (a), cross-linking agent (b), and compound (c) through a stirrer; and dissolving or dispersing the mixture into a solvent, for subsequent applications. The solvent here can be any solvent which can dissolve (or disperse) but not react with the components of the resin composition of the present invention. For example, the solvent may be selected from a group consisting of toluene, γ-butyrolactone, methyl ethyl ketone, cyclohexanone, butanone, acetone, xylene, methyl isobutyl ketone, N,N-dimethyl formamide (DMF), N,N-dimethyl acetamide (DMAc), N-methyl-pyrolidone (NMP), and combinations thereof, but is not limited thereto. The amount of the solvent is not particularly limited as long as the components of the resin composition can be evenly mixed. In some embodiments of the present invention, a mixture of toluene and γ-butyrolactone is used as the solvent, and the amount of the solvent is about 120 parts by weight per 100 parts by weight of the total weight of the resin (a), cross-linking agent (b), and compound (c).

The present invention further provides a prepreg which is obtained by immersing a substrate (a reinforcing material) into the resin composition of the present invention and drying the immersed substrate. A conventional reinforcing material includes a glass fiber cloth (a glass fiber fabric, a glass fiber paper, a glass fiber mat, etc.), a kraft paper, a short fiber cotton paper, a nature fiber cloth, an organic fiber cloth, etc. In some embodiments of the present invention, 2116 glass fiber cloths are illustrated as the reinforcing materials, and the reinforcing materials are heated and dried at 175° C. for 2 to 10 minutes (B-stage) to provide half-hardened prepregs.

The abovementioned prepregs can be used for manufacturing laminates. Thus, the present invention further provides a laminate comprising a synthetic layer and a metal layer, wherein the synthetic layer is made from the above prepregs. The laminate may be prepared by the following process: superimposing a plurality of prepregs and superimposing a metal foil (such as a copper foil) on at least one external surface of the superimposed prepregs to provide a superimposed object; performing a hot-pressing operation onto the object to obtain the laminate. Moreover, a printed circuit board can be obtained by making a pattern on the metal foil of the laminate.

The present invention will be further illustrated by the embodiments hereinafter, wherein the measuring instruments and methods are respectively as follows:

[Gel Time Test]

The method for testing gel time comprises the following steps: placing 0.2 g of resin composition sample on a hot plate at 171° C. and subjecting the sample to form a disc (2 cm$^2$ in area); and calculating the time required for the sample to not adhere to the stirring rod used for stirring the sample or until the sample becomes cured. The time required is regarded as the gel time.

[H₂O Absorption Test]

The H₂O absorption of the laminate is tested by pressure cooker test (PCT), i.e., subjecting the laminate into a pressure container (121° C., 100% R.H. and 1.2 atm) for 2 hours.

[Solder Resistance Test]

The solder resistance test is carried out by immersing the dried laminate in a solder bath at 288° C. for a while and observing whether there is any defect such as delamination and expansion.

[Peeling Strength Test]

Peeling strength refers to the bonding strength between metal foil and a laminated prepreg, and which is usually expressed by the force required for vertically peeling the clad copper foil with a width of ⅛ inch from the surface of the laminated prepreg.

[Glass Transition Temperature Test]

Glass transition temperature (Tg) is measured by using a Differential Scanning calorimeter (DSC), wherein the measuring methods are IPC-TM-650.2.4.25C and 24C testing method of the Institute for Interconnecting and Packaging Electronic Circuits (IPC).

[Flame Retardance Test]

The flame retardance test is carried out according to UL94V (Vertical Burn), which comprises the burning of a laminate, which is held vertically, using a Bunsen burner to obtain its self-extinguishing properties.

[Dielectric Constant and Dissipation Factor Measurement]

Dk and Df are measured according to ASTM D150 under an operating frequency of 1 GHz.

EXAMPLES

Preparation of the Resin Composition

Example 1

According to the ratio shown in Table 1, polyphenylene ether resin of the above described formula (I) (R1 and R2 are $CH_3$, and A1 and A2 are

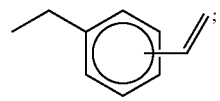

Mitsubishi), TAIC (Aldrich Chemistry), bismaleimide of the described formula above (II) (R" is $CH_2$; Ki-Chemical), decabromodiphenyl ethane (Albermarle), and silica powder (Denka) were mixed under room temperature with a stirrer for about 60 minutes followed by adding toluene and γ-butyrolactone thereinto. After stirring the resultant mixture under room temperature for about 120 minutes, resin composition 1 was obtained. The gel time of resin composition 1 was measured and the result is tabulated in Table 1.

Example 2

The preparation procedures of Example 1 were repeated to prepare resin composition 2, except that the amount of polyphenylene ether resin and bismaleimide were adjusted to about 65 parts by weight and about 15 parts by weight, respectively, as shown in Table 1. The gel time of resin composition 2 was measured and the result is tabulated in Table 1.

Example 3

The preparation procedures of Example 1 were repeated to prepare resin composition 3, except that the amount of polyphenylene ether resin and bismaleimide were adjusted to about 50 parts by weight and about 30 parts by weight, respectively, as shown in Table 1. The gel time of resin composition 3 was measured and the result is tabulated in Table 1.

Example 4

The preparation procedures of Example 1 were repeated to prepare resin composition 4, except that the amount of TAIC and bismaleimide were adjusted to about 25 parts by weight and about 15 parts by weight, respectively, as shown in Table 1. The gel of resin composition 4 was measured and the result is tabulated in Table 1.

Example 5

The preparation procedures of Example 1 were repeated to prepare resin composition 5, except that the amounts of the components were changed as shown in Table 1. The gel time of resin composition 5 was measured and the result is tabulated in Table 1.

Example 6

The preparation procedures of Example 1 were repeated to prepare resin composition 6, except that the amounts of the components were changed as shown in Table 1. The gel time of resin composition 6 was measured and the result is tabulated in Table 1.

Comparative Example 1

The preparation procedures of Example 1 were repeated to prepare comparative resin composition 1, except that the amount of polyphenylene ether resin was about 80 parts by weight and bismaleimide was not used. The gel time of comparative resin composition 1 was measured and the result is tabulated in Table 1.

TABLE 1

| | parts by weight | Example 1 | Example 2 | Example 3 | Example 4 | Example 5 | Example 6 | Comparative example 1 |
|---|---|---|---|---|---|---|---|---|
| resin (a) | polyphenylene ether resin | 60 | 65 | 50 | 60 | 60 | 75 | 80 |
| cross-linking agent (b) | TAIC | 20 | 20 | 20 | 25 | 15 | 20 | 20 |
| compound (c) | bismaleimide | 20 | 15 | 30 | 15 | 20 | 10 | 0 |

TABLE 1-continued

| parts by weight | | Example 1 | Example 2 | Example 3 | Example 4 | Example 5 | Example 6 | Comparative example 1 |
|---|---|---|---|---|---|---|---|---|
| flame retardance | decabromodiphenyl ethane | 13 | 13 | 13 | 13 | 15 | 15 | 13 |
| filler | silica powder | 20 | 20 | 20 | 20 | 25 | 20 | 20 |
| solvent | toluene | 60 | 60 | 60 | 60 | 60 | 60 | 60 |
| | γ-butyrolactone | 60 | 60 | 60 | 60 | 60 | 60 | 60 |
| property of the resins | Gel time (sec) | 120 | 135 | 110 | 130 | 115 | 140 | 1000 |

As shown in Table 1, the gel time of each of the resin compositions (Examples 1 to 6) of the present invention was less than 150 seconds, and thus, it can considerably shorten the preparation time when using the resin compositions to prepare prepregs and laminates. On the contrary, the gel time of the resin composition of Comparative example 1, using only cross-linking agent and polyphenylene ether resin, was seven times higher than that of the resin composition of the present invention, and this is unfavorable for preparing the prepreg and laminate efficiently and economically.

[Preparation of the Laminate]

The laminate was prepared using resin compositions of Examples 1 to 6 and Comparative example 1, respectively. In detail, one of those resin compositions was coated on 2116 reinforced glass fiber cloths by a roll coater. The coated 2116 reinforced glass fiber cloths were then placed in an oven and dried at 175° C. for 2 to 10 minutes to produce a prepregs in a half-hardened state (resin content: about 50%). Four pieces of the prepregs were superimposed and two sheets of copper foil (0.5 oz.) were respectively superimposed on the two external surfaces of the superimposed prepregs to provide a superimposed object. A hot-pressing operation was performed on each of the prepared objects to provide laminates 1 to 6 (corresponding to resin compositions 1 to 6), and Comparative laminate 1 (corresponding to Comparative resin composition 1). Herein, the hot-pressing conditions are as follows: raising the temperature to 205° C. with a heating rate of 3.0° C./min, and hot-pressing for 120 minutes under the full pressure of 15 kg/cm² (initial pressure is 8 kg/cm²) at 205° C.

The H₂O absorption, solder resistance, peeling strength, glass transition temperature (Tg), flame retardance, dielectric constant (Dk), and dissipation factor (Df) of the laminates 1 to 6, and Comparative laminate 1 were analyzed and the results is tabulated in Table 2.

TABLE 2

| | unit | Example 1 | Example 2 | Example 3 | Example 4 | Example 5 | Example 6 | Comparative example 1 |
|---|---|---|---|---|---|---|---|---|
| H₂O absorption | % | 0.25 | 0.22 | 0.20 | 0.23 | 0.27 | 0.22 | 0.35 |
| solder resistance | minute | >10 | >10 | >10 | >10 | >10 | >5 | delamination |
| peeling strength | pound/inch | >5 | >5 | >5 | >5 | >5 | >5 | <3 |
| glass transition temperature (Tg) | ° C. | 205 | 198 | 215 | 200 | 203 | 190 | 180 |
| flame retardance (UL 94) | grade | V0 | V0 | V0 | V0 | V0 | V0 | V0 |
| dielectric constant (Dk)@ 1 GHz | | 3.65 | 3.62 | 3.72 | 3.63 | 3.67 | 3.55 | 3.66 |
| dissipation factor (Df)@ 1 GHz | | 0.0040 | 0.0037 | 0.0047 | 0.0038 | 0.0037 | 0.0035 | 0.0047 |

As shown in Table 2, the laminates 1 to 6 manufactured by using the resin compositions of the present invention were provided with satisfactory physicochemical properties (such as moisture resistance, flame retardance, Dk, Df, etc.), and outstanding heat resistance (a high Tg, and excellent solder resistance). Thus, the resin composition of the present invention can be more extensively used. In addition, the laminates 1 to 6 were significantly improved in terms of the adhesion to the metal foil.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A resin composition consisting essentially of:
(a) a resin of formula (I);

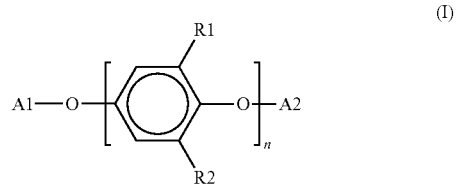

(b) a cross-linking agent selected from a group consisting of triallyl isocyanurate (TAIC), allyl-containing styrene maleic anhydride (SMA) resin, and mixtures thereof; and (c) a compound of formula (II);

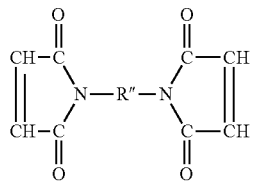
(II)

wherein,

R1 and R2 are independently H or a substituted or unsubstituted $C_1$-$C_{10}$ alkyl;

A1 and A2 are independently a vinyl-containing or allyl-containing group;

n is an integer ranging from 10 to 60;

R" is a substituted or unsubstituted methylene, 4,4'-diphenylmethane, m-phenylene, bisphenol A diphenyl ether, 3,3'-dimethyl-5,5'-diethyl-4,4'-diphenyl methane, 4-methyl-1,3-phenylene, or (2,2,4-trimethyl) hexane; and the weight ratio of the resin (a) to the cross-linking agent (b) is about 6:1 to about 1:1, and the weight ratio of the compound (c) to the total weight of the resin (a) and the cross-linking agent (b) is about 1:1 to about 1:10.

2. The resin composition of claim 1, wherein R1 and R2 are independently H or a substituted or unsubstituted methyl, and A1 and A2 are independently selected from a group consisting of

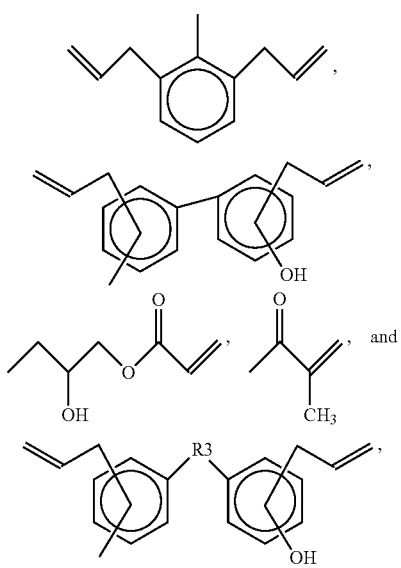

and R3 is —O— or —SO$_2$—.

3. The resin composition of claim 1, wherein R" is —CH$_2$—,

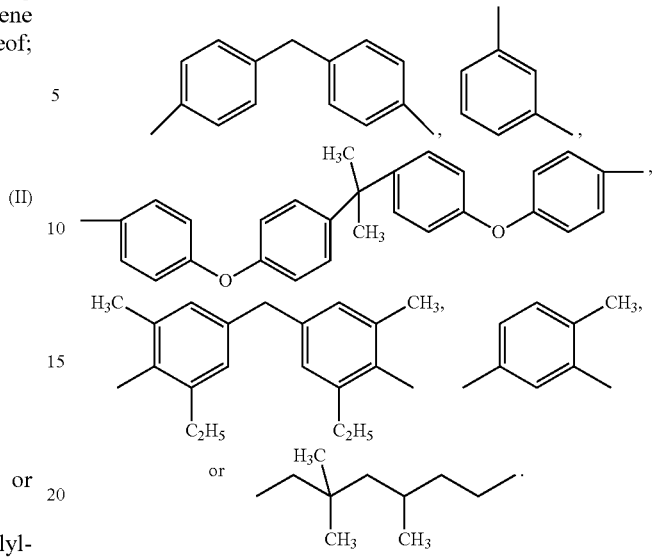

4. The resin composition of claim 1, wherein the weight ratio of the resin (a) to the cross-linking agent (b) is about 4:1 to about 1:1.

5. The resin composition of claim 2, wherein the weight ratio of the resin (a) to the cross-linking agent (b) is about 4:1 to about 1:1.

6. The resin composition of claim 3, wherein the weight ratio of the resin (a) to the cross-linking agent (b) is about 4:1 to about 1:1, and the weight ratio of the compound (c) to the total weight of the resin (a) and the cross linking agent (b) is about 1:1 to about 1:10.

7. The resin composition of claim 1, which further comprises an additive selected from a group consisting of a hardening promoter, a filler, a dispersing agent, a flexibilizer, a retardant, and a mixture thereof.

8. The resin composition of claim 2, which further comprises an additive selected from a group consisting of a hardening promoter, a filler, a dispersing agent, a flexibilizer, a retardant, and a mixture thereof.

9. The resin composition of claim 3, which further comprises an additive selected from a group consisting of a hardening promoter, a filler, a dispersing agent, a flexibilizer, a retardant, and a mixture thereof.

10. The resin composition of claim 7, wherein the retardant is a phosphorus flame retardant or bromine-containing flame retardant, and the filler is selected from a group consisting of silica, glass powder, talc, kaolin, pryan, mica, inorganic metal oxide(s), and a mixture thereof.

11. The resin composition of claim 8, wherein the retardant is a phosphorus flame retardant or bromine-containing flame retardant, and the filler is selected from a group consisting of silica, glass powder, talc, kaolin, pryan, mica, inorganic metal oxide(s), and a mixture thereof.

12. The resin composition of claim 9, wherein the retardant is a phosphorus flame retardant or bromine-containing flame retardant, and the filler is selected from a group consisting of silica, glass powder, talc, kaolin, pryan, mica, inorganic metal oxide(s), and a mixture thereof.

13. A prepreg, which is prepared by immersing a substrate into the resin composition of claim 1, and drying the immersed substrate.

14. A laminate, comprising a synthetic layer and a metal layer, wherein the synthetic layer is made from the prepreg of claim 13.

* * * * *